(12) United States Patent
Gaiser

(10) Patent No.: US 8,783,414 B2
(45) Date of Patent: Jul. 22, 2014

(54) EXHAUST SYSTEM

(75) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 178 days.

(21) Appl. No.: 13/185,615

(22) Filed: Jul. 19, 2011

(65) Prior Publication Data

US 2012/0017565 A1 Jan. 26, 2012

(30) Foreign Application Priority Data

Jul. 22, 2010 (DE) .......................... 10 2010 031 855

(51) Int. Cl.
*F01N 1/24* (2006.01)
*E04B 1/84* (2006.01)
*F01N 1/00* (2006.01)

(52) U.S. Cl.
USPC .......................................... 181/252; 181/256

(58) Field of Classification Search
USPC ......... 181/228, 230, 252, 256, 258, 240, 290, 181/294, 284
See application file for complete search history.

(56) References Cited

U.S. PATENT DOCUMENTS

| | | | | |
|---|---|---|---|---|
| 3,823,743 A * | 7/1974 | King | ................................ | 138/42 |
| 4,015,683 A * | 4/1977 | Williams | ....................... | 181/231 |
| 4,027,476 A * | 6/1977 | Schmidt | ........................... | 60/218 |
| 4,082,160 A * | 4/1978 | Schilling et al. | ............... | 181/258 |
| 4,316,523 A * | 2/1982 | Boretti | ........................... | 181/226 |
| 4,615,411 A * | 10/1986 | Breitscheidel et al. | ........ | 181/224 |
| 4,713,277 A * | 12/1987 | Akiyama et al. | ............... | 428/131 |
| 4,732,594 A * | 3/1988 | Mizrah et al. | ..................... | 55/523 |
| 5,067,584 A | 11/1991 | Williams et al. | | |
| 5,266,143 A * | 11/1993 | Albera et al. | .................. | 156/245 |
| 5,400,830 A | 3/1995 | Stiles et al. | | |
| 5,559,310 A * | 9/1996 | Hoover et al. | ................. | 181/230 |
| 6,109,387 A * | 8/2000 | Boretti | .......................... | 181/230 |
| 6,152,259 A * | 11/2000 | Freist et al. | .................... | 181/290 |
| 6,196,351 B1 * | 3/2001 | Clokey et al. | ................. | 181/252 |
| 6,237,717 B1 * | 5/2001 | Osanai et al. | .................. | 181/294 |
| 6,857,502 B2 * | 2/2005 | Naito | .............................. | 181/252 |
| 6,875,066 B2 * | 4/2005 | Wolaver | .......................... | 440/77 |
| 7,546,899 B2 * | 6/2009 | Tomerlin et al. | .............. | 181/252 |
| 7,721,846 B2 * | 5/2010 | Swift et al. | ..................... | 181/293 |
| 7,954,596 B2 * | 6/2011 | Schulze et al. | ................ | 181/204 |
| 7,980,358 B2 * | 7/2011 | Soltau et al. | ................... | 181/286 |
| 8,051,950 B2 * | 11/2011 | Alston | ........................... | 181/294 |
| 8,132,645 B2 * | 3/2012 | Weber | ............................ | 181/233 |
| 8,256,569 B1 * | 9/2012 | Huff et al. | ...................... | 181/252 |
| 8,276,710 B2 * | 10/2012 | Soltau et al. | ................... | 181/294 |
| 2002/0153199 A1 * | 10/2002 | Schroer et al. | ................. | 181/286 |
| 2005/0067218 A1 * | 3/2005 | Bristow et al. | ................ | 181/237 |
| 2005/0126848 A1 * | 6/2005 | Siavoshai et al. | ............. | 181/207 |
| 2008/0067001 A1 * | 3/2008 | Sviridenko et al. | ........... | 181/286 |
| 2010/0116583 A1 * | 5/2010 | Seedorf | ......................... | 181/205 |
| 2010/0307866 A1 * | 12/2010 | Zickmantel | .................... | 181/286 |

FOREIGN PATENT DOCUMENTS

| | | | |
|---|---|---|---|
| DE | 10244798 A1 | 4/2004 | |
| DE | 10337156 A1 | 3/2005 | |
| DE | 102007026123 A1 | 12/2008 | |
| EP | 0 216 729 A1 | 4/1987 | |
| EP | 0 261 050 A2 | 3/1988 | |
| EP | 602535 A2 * | 6/1994 | ............ G10K 11/26 |
| EP | 0 867 605 A1 | 9/1998 | |
| EP | 1 507 072 A2 | 2/2005 | |
| EP | 2 009 132 A1 | 12/2008 | |
| JP | 58 104318 A | 6/1983 | |

* cited by examiner

*Primary Examiner* — Edgardo San Martin
(74) *Attorney, Agent, or Firm* — McGlew and Tuttle, P.C.

(57) ABSTRACT

A component of an exhaust system for a combustion engine, particularly of a motor vehicle, which at least in part regions includes a self-supporting jacket. The jacket includes a porous, open-pore or closed-pore cellularly constructed foam. The foam is of a self-supporting design. By using such a foam the insulation of the component can be improved.

20 Claims, 3 Drawing Sheets

EXHAUST SYSTEM

CROSS REFERENCE TO RELATED APPLICATIONS

This application claims the benefit of priority under 35 U.S.C. §119 of German Patent Application DE 10 2010 031 855.8 filed Jul. 22, 2010, the entire contents of which are incorporated herein by reference.

FIELD OF THE INVENTION

The invention relates to a component of an exhaust system with a self-supporting jacket, and an exhaust system with a self-supporting jacket. A method for producing a component of an exhaust system is additionally likewise a subject of the invention.

BACKGROUND OF THE INVENTION

Exhaust systems for combustion engines, particularly in a motor vehicle, are today constructed in the region of a jacket of the respective component from solid material such as for example pipes. Since the use of such solid materials in the jacket region of the exhaust system results in a high weight, all connecting points of the exhaust system to the motor vehicle have to be dimensioned accordingly. Because of the solid design, particularly of the jacket region, production is additionally possible only through high material consumption and high costs. Accordingly, because of the solid design, the exhaust system is also poorly insulated. Here, the poor insulation results in heat losses that are too high. Furthermore, the heavy components because of their large heat capacity particularly in starting operation of the motor vehicle result in heating-up problems, particularly relatively long heating-up phases, with some exhaust system components such as for example an oxidation catalytic converter or other catalytic converters arranged in the exhaust system. Because of the slow heating-up of such components, which only take up their function from a predefined operating temperature, the exhaust emission values are correspondingly poor especially during the starting operation of the motor vehicle or expensive design precautions such an air gap insulation and/or operational precautions such as for example an engine heating strategy have to be taken so that the heating-up takes place quickly and the exhaust emission values are in a tolerable range.

SUMMARY OF THE INVENTION

The present invention now deals with the problem of stating an improved or at least an alternative embodiment for an exhaust system and/or a component thereof, as well as a corresponding manufacturing method which is particularly characterized by an improved insulation with simultaneously low weight and high stability.

According to the invention, a component of an exhaust system for a combustion engine is provided. The component comprises a self-supporting jacket having a porous cellularly constructed foam. The foam is of a self-supporting design (the foam has self-supporting properties).

According to another aspect of the invention, an exhaust system is provided comprising an exhaust gas pipe and an exhaust component. The exhaust component is connected to the exhaust gas pipe. The exhaust component comprises a self-supporting jacket. The self-supporting jacket comprises a porous cellularly constructed foam. The foam has self-supporting properties.

According to another aspect of the invention, a method is provided for producing a component of an exhaust system. The method comprises the steps of providing a raw foam compound and admixing a foaming agent in different concentrations to the raw foam compound in at least two jacket regions. The raw foam compound is baked with two jacket regions so that a component jacket has, in at least the two jacket regions, following the baking, at least one of a different density and a different material thickness.

The invention is based on the general idea of equipping an exhaust system and/or a component of an exhaust system in at least one part region with a self-supporting jacket having a porous, open or closed-pore cellularly constructed foam, wherein the foam is of the self-supporting design.

Through such a design of the jacket of an exhaust system and/or of a component of the exhaust system one succeeds in substantially reducing the weight of such a jacket because of the low density of the foam without having to accept a reduction of the stability. Because of the cellular structure of the jacket of the exhaust system and/or at least one component of the exhaust system in at least one part region, the insulation is clearly improved at least in this part region, since through the hollow spaces enclosed within the cell walls the closed-pore foam has an insulating effect.

An exhaust system can comprise a plurality of components such as for example an exhaust manifold which is fluidically connected to the combustion chambers of the combustion engine, a charging device, a pre-pipe connected to the charging device, an oxidation catalytic converter, a diesel particle filter, a front exhaust pipe, an HWL (urea-water solution) metering device, an SCR (selective catalytic reduction) catalytic converter, an NSK (NOx storage catalytic converter), a silencer (muffler), a rear exhaust pipe or the like. Part regions of such components or a plurality of such components as well as part regions of the entire exhaust system can comprise a jacket in the sense of the invention.

Here, a jacket is to mean the envelope surrounding the respective part region in circumferential direction. Thus, a jacket can also mean at least a part region of a housing or for example the exhaust system proper. Furthermore, such a jacket can also be formed through a pipe system such as for example the exhaust manifold. Likewise, a housing for example of a catalytic converter can for example also be at least partially enveloped by such a jacket. Here, such a jacket is of the self-supporting design.

A jacket in the sense of the invention comprises a closed-pore, porous, cellular foam which has self-supporting properties. Alternatively, the jacket could also have an open-pore foam with closed inside and/or outside.

The term porosity or porous is to mean a physical quantity which represents the ratio of hollow space volume to total volumes of a material. According to this definition a material is porous when it comprises a hollow space volume. If such a porous material were to be impressed, the compressed material because of the at least partial destruction of the hollow space volume would have a smaller volume. Accordingly, porous materials have a lower density than non-porous materials with the same material composition. Thus, the porosity is to be understood three-dimensionally.

Here, closed porous means a cellular structure. In this case the individual hollow space volumes are enclosed by cell walls and separated from one another. As a rule, no exchange of matter between the individual hollow space volumes can take place unless the matter defuses through the cell walls. In contrast with this the hollow space volume with an open porous material is at least partially interconnected so that fluids can enter an open porous material. Thus, in contrast with the closed porous material, the open porous material is not fluid-tight.

In contrast, the terms open pore or closed-pore are only used with respect to the surface of materials. Here, open-pore is to mean the occurrence of pores or of small openings in or on the surface, while closed-pore materials have no pores in or on the surface whatsoever. Open-pore surfaces are fluid-permeable and closed-pore surfaces are fluid-tight, wherein the pore size determines the tightness regarding certain fluids and the permeability to other fluids. Accordingly, in sound approximation, the term of porosity can be classified as a two-dimensional phenomenon since it only affects the surface of materials.

If a jacket at least in part regions is now constructed of a porous, closed-pore, cellularly constructed foam the volume surrounded by the jacket is closed off in a sufficiently fluid-tight manner and through the porous structure of the jacket substantial weight and material can be additionally saved.

Self-supporting or self-supporting properties is to mean a certain stability of the jacket or of the foam so that the jacket or the foam manages to do without additional supporting and load-bearing components such as for example a pipe and can thus be directly connected to the motor vehicle. Accordingly, the jacket or foam is designed to be stable in such a manner that it withstands the usual usage loads in an installation position with the motor vehicle and need not be reinforced through additional load-bearing components. In this case, for example with a pipe/foam design, the foam takes over at least a part of the load-bearing function of the jacket designed in pipe/foam design. Accordingly, a self-supporting foam need not completely absorb the forces acting on the jacket, but it can also take over only a part of the load-bearing function of the entire jacket system.

Here, the stability of the foam or its load-bearing properties materialize through a self-supporting of the walls on one another. In addition to this self-supporting of the cell walls on one another, framework-like and/or net-like structures can be additionally formed in the foam, which likewise because of their being self-supporting on one another can contribute to the stability of the foam and its self-supporting properties. These framework-like and/or net-like structures can be specifically designed during the manufacture of the foam so that the desired stability of the foam is already controllable even during the manufacture.

Advantageously, a jacket having such a foam is designed fluid tight regarding the fluids flowing in the exhaust system and because of the porous structure of the foam such a jacket has a low weight. In addition, because of the porous design of the foam, material can be saved and, with corresponding design of the foam, the stability compared with a jacket in solid design can be additionally increased. In addition, as already discussed earlier on, the jacket is advantageously insulated against heat escape from the exhaust gas into the surroundings through such a foam.

In a preferred embodiment the outer surface and/or the inner surface of a part region of the foam (foam structure) can have a non-porous outer surface region and/or a non-porous inner surface region. These non-porous surface regions can be imagined in the manner of a skin which in this case is likewise of a closed-pore design. Here, accordingly, the skin or the non-porous surface region is formed solidly. Such a non-porous surface region compared with the foam is thus produced from compacted material.

Accordingly, the jacket, at least in the region of the foam, can at least partially comprise a non-porous outer surface region and/or a non-porous inner surface region depending on where the foam is arranged on the jacket. The foam can be arranged on the outside and/or inside, wherein in this case the foam because of its self-supporting properties contributes to the stability of the jacket. Particularly, preferably the jacket is formed at least in a part region completely from the foam.

Preferably the non-porous outer surface region and/or the non-porous inner surface region is/are each arranged on the foam.

If the foam now has such a non-porous, closed-pore surface region the tightness of the jacket relative to the gas escape from the exhaust system is advantageously improved. As a result of this, the pressure loss within the exhaust system can be at least reduced, which is due to the closed-pore inner skin being comparatively smooth and thus having a reduced roughness, which reduces the flow friction on the wall and ultimately reduces the flow resistance and accordingly the pressure loss. In addition, because of the closed formation of the respective surface region, the foam is protected from sooting in this region, since fluids, if at all, can only enter the foam by way of the diffusion. Through such a non-porous closed-pore surface region this diffusion can be at least reduced. In addition, with such a non-porous outer surface region, simpler handling because of the closed, more stable surface is possible and the entry of water, particularly of salt water in the exhaust system in the region of the foam can be prevented. With such a design of a non-porous inner region the absorption of condensation water from the exhaust gas, which as a rule has very severe corroding properties, can be clearly reduced and in certain cases even be prevented so that any concomitant corrosion of the exhaust system can be clearly reduced.

Here, inside or inner is to mean the surface region which delimits the inner volume of the exhaust system while outside or outer designates the surface region which delimits the exhaust system with regard to the surroundings.

In the case of the formation of a non-porous, closed-pore surface region as skin the thickness of the skin preferably amounts to 1 to 20-times that of an average cell wall thickness, particularly preferably 1 to 10-times and very particularly preferred 1 to 5-times that.

Such a non-porous, closed-pore surface region can also be formed by a pipe. In this case, inside and/or outside on the foam a pipe is arranged. If an inner pipe is provided, a raw foam compound can be injection-molded onto the inner pipe through an injection-molding method and molded through subsequent baking-on.

In the case of the presence of an outer pipe the raw foam compound can, for example likewise with an injection-molding method, be injection-molded onto the inside of the outer pipe and subsequently baked in. In this case it is likewise possible to allow the raw foam compound to flow into the outer pipe and to evenly distribute the raw foam compound radially on the inside of the outer pipe through rotation of the outer pipe. In this case, too, the raw foam compound can be joined to the outer pipe through subsequent baking-in.

In a preferred embodiment both an inner and an outer pipe are used, wherein following positioning and fixing of the inner pipe in the outer pipe, the raw foam compound can be filled into the intermediate space formed between the inner and the outer pipe. Through subsequent baking the foam can be formed in the intermediate space between inner and outer pipe.

Preferably, the radial thickness of the inner and/or outer pipe amounts to 0.01% to 20% of the radial thickness of the entire jacket. Particularly preferably the radial thickness of the inner and/or outer pipe amounts to 0.01% to 1% of the radial thickness of the entire jacket and very particularly preferred the radial thickness of the inner and/or outer pipe amounts to 0.01% to 0.5% of the radial thickness of the entire jacket.

Here, the radial thickness of the jacket or of the outer and/or inner pipe is to mean the radially measurable material thickness of the jacket and/or of the inner and/or outer pipe and/or of the foam.

If no inner and/or outer pipe is used, such a non-porous outer surface region and/or non-porous inner surface region can be realized through baking of a raw foam compound in a mold. If applicable, the mold can be heated slightly above the melting point of the foam. Through such a foaming-out in a mold the porous, cellular structure of the foam can be formed in the hollow space of the mold. Since in this case the forming foam contacts the walls of the mold, a non-porous and/or closed-pore inner and/or outer surface region can be produced through appropriate process control.

However, it is also possible through subsequent forming such as compressing, if necessary under severe short-term partial surface heating of the mold, to form and/or reinforce the non-porous and/or closed-pore surface region.

In a preferred embodiment the radial thickness of the respective non-porous and/or closed surface region amounts to 0.01% to 2% of the radial thickness of the total material. Particularly preferably the radial thickness of the corresponding non-porous and/or closed-pore surface region amounts to 0.01% to 1% and very particularly preferred 0.01% to 0.02% of the radial thickness of the total jacket.

In a particularly preferred embodiment the part region of an exhaust system and/or of a component of an exhaust system is designed as integrally continuous component. Advantageous in such a design is the possibility of designing the respective integrally continuous component in one operation. Because of the simple structure, manufacture is additionally simplified and cost-effective.

Preferably, a metal or a metal alloy is used as material for the foam. Particularly preferably aluminum and aluminum alloys as well as iron and/or steel as well as iron and/or steel alloys are used. Particularly preferably the foam is produced from stainless steel and/or comprises stainless steel at least in part regions.

Likewise conceivable are foams of mineral materials such as clays, ceramics or the like.

Likewise preferable is a material mix in sandwich design, wherein the foam itself in this case can be constructed of radially different layers. Preferably, in this case, the inside layer, that is the foam arranged on the inside or the non-porous and/or closed-pore inner surface region is formed of a stainless steel alloy. This has the advantage that the material because of the corrosion resistance of the stainless steel alloy is now likewise designed corrosion-resistant on the inside.

A middle foam layer is preferably constructed from aluminum or an aluminum alloy.

An outside foam layer or the non-porous and/or closed-pore outer surface region in this case can likewise be constructed of an aluminum alloy or preferably of a stainless steel alloy, as a result of which the outside jacket also becomes more corrosion resistant. In the case of the usage of an inside and outside stainless steel alloy, the stainless steel alloys can have a different composition.

However, other material pairings are also conceivable, wherein mineral materials or foams can also be employed. These mineral foams are then preferably arranged between an inner and an outer pipe.

Particularly preferably the foam regions subjected to increased loads and forces are designed reinforced with respect to the thickness and/or density. Thus it is conceivable for example to equip a bend of the jacket with a foam of increased thickness and/or density compared to the remaining pipe course. Because of this, such a region subjected to greater load is designed more resistant to damages or material fatigues. In this region, another material composition compared with the remaining region of lower load exposure can also be employed.

Thus, in this case, the material of the jacket has a different density and/or a different material and/or a different wall thickness at least in two regions. Such different thicknesses, densities and/or materials can be simply produced in terms of process for example with the help of the injection molding method.

Furthermore, connecting elements for example such as flanges, welding rims, holders or the like can be incorporated in the foam. Such connecting elements with their coupling portion can be sunk into the foam and permanently connected to the latter. Here, during the production of the foam, this coupling region can be inserted into the raw foam compound so that following the baking of the foam this coupling region is positively and/or materially and/or frictionally connected to the foam.

Preferably, the coupling region is equipped with a surface structure preventing a simple detaching of the coupling region from the foam. Conceivable would be the formation of hooks, sleeves, waves, jags, holds or twists in the coupling region, so that among other things also because of the enlarged surface a more intense connection between coupling region and foam occurs.

Furthermore, an open-pore inner surface region is likewise to be provided preferentially on the inside of the jacket. Such an open-pore inner surface region can have an advantageous effect with respect to the acoustics of the exhaust system since with suitable configuration the open-pore surface region can comprise a sound absorption.

Likewise acoustics-improving, an open porous foam can be advantageously arranged on the inside. Here, such an open porous foam can be designed integrally from the same material as the closed-pore foam or be applied as separate foam from another material onto the closed porous foam in a separate foaming-up process. In the case of an integral formation of the open porous with the closed porous foam such a formation of an inside foam can be formed through suitably set process parameters both during the application of the raw foam compound as well as during the baking.

In process terms, this can be realized for example through a different concentration of the foaming agent in the raw foam compound. Thus, particularly in the case of an injection molding method, the quantity of added foaming agent in the raw foam compound can be controlled by layers. Accordingly, a different radial and/or axial thickness of the foam and/or a different density starting from highly porous, low-porous to non-porous part regions can be formed in the foam through the variation of the concentration of the foaming agent in the raw foam compound. Here, it is also conceivable that in the case of the non-porous and/or closed-pore surface regions the foaming agent is entirely omitted so that exactly this desired non-porous and/or closed-pore surface region forms on the inside and/or outside.

Because among other things of a skillful variation of the concentration of the foaming agent one has a greater flexibility in designing a jacket with such a foam. If, additionally, in this case the injection molding method is used, a wide range of design forms of a jacket are possible.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters refer to same or similar of functionally same components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
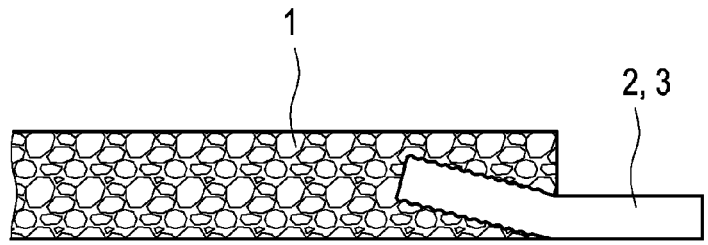
FIG. 1a is a sectional view showing one of various embodiments of a foam with a flange inserted in the foam.
Figure 1B:
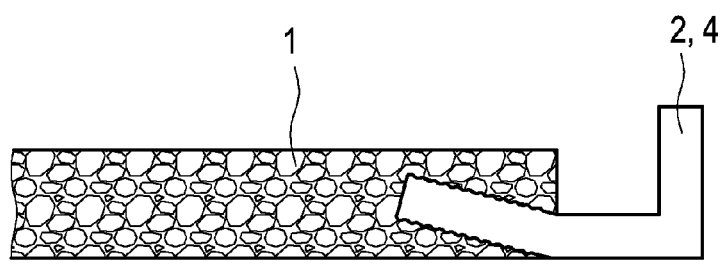
FIG. 1b is a sectional view showing one of various embodiments of a foam with a flange inserted in the foam.

Referring to the drawings in particular, as shown in FIG. 1a, a connecting element 2 can be inserted in a foam 1. Here, the connecting element 2 can be designed as welding rim 3 or as shown in FIG. 1b, as welding flange 4.

Figure 2A:
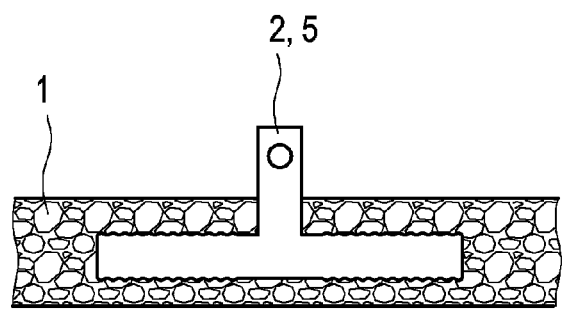
FIG. 2a is a sectional view showing foam with holder inserted therein and integrally formed therewith.
Figure 2B:
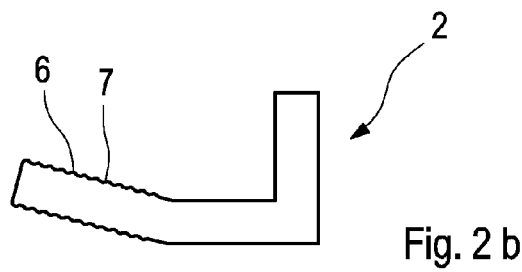
FIG. 2b is a side view of the holder for insertion and integration in the foam.

It is likewise conceivable, as shown in FIG. 2a, to provide the foam 1 with a holder 5 as part of the connecting element 2 inserted in the foam. Preferably, the coupling region 6 of the connecting element 2 in this case is equipped with a surface contour 7. This surface contour, as shown in FIG. 2b, can be designed as a type of weight shape, but hooks, eyes, branches of the like can also be formed on the coupling region 6.

Preferably, the coupling region 6 with the remaining connecting element is formed from the same material. Particularly preferably at least the surface of the coupling region 6 is of the open-pore design and very particularly preferred, the coupling region 6 is of the open-pore and at least partially open porous design.

Through such an open-pore or open porous design, entering of the foam in the coupling region 6 is made possible, as a result of which a more stable connection of the coupling region to the foam 1 is achieved. This is likewise so in the case of eyes.

Figure 3:
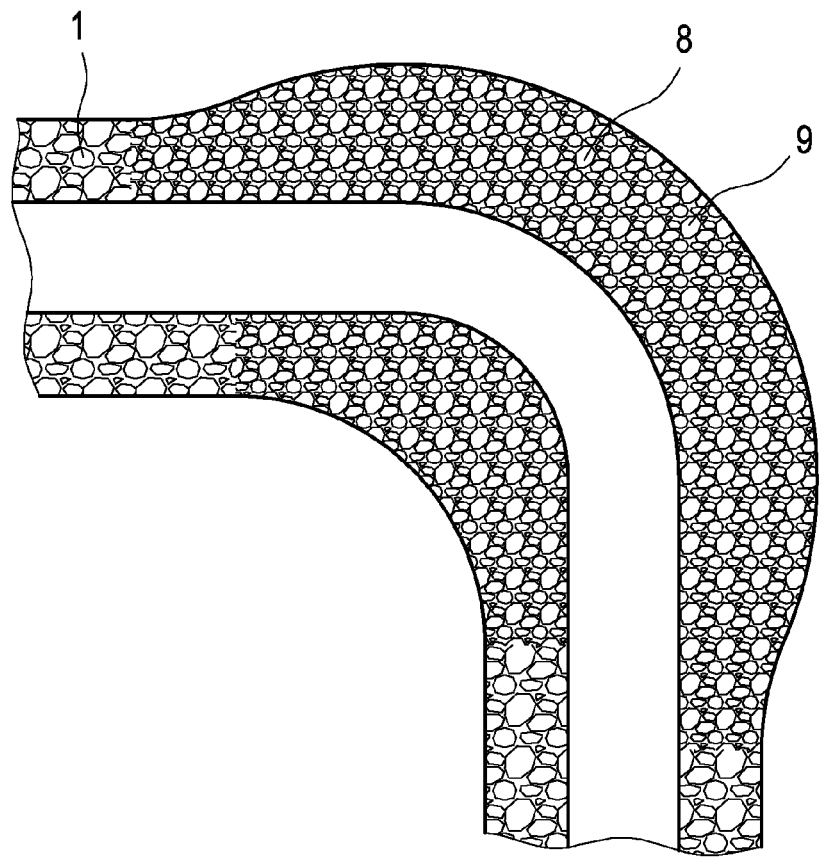
FIG. 3 is a sectional view showing a reinforcement of the foam in a region subjected to greater load.

As is shown in FIG. 3, the foam 1 is preferably equipped with a reinforcement 9 in a region 8 subjected to greater load, as in this case on a bent. This reinforcement 9 can constitute reinforcement of the radial thickness of the material or it is also conceivable that in this region less foaming agent is admixed to the raw foam compound so that the proportion of non-foaming agent in this region subjected to high load is higher and thus contributes to an increased stability of the region. Accordingly, following the baking of the raw foam compound, the reinforcement 9 will have a greater density. Particularly preferably in such a region 8 subjected to greater load the reinforcement 9 will have a greater radial thickness and/or density.

Figure 4:
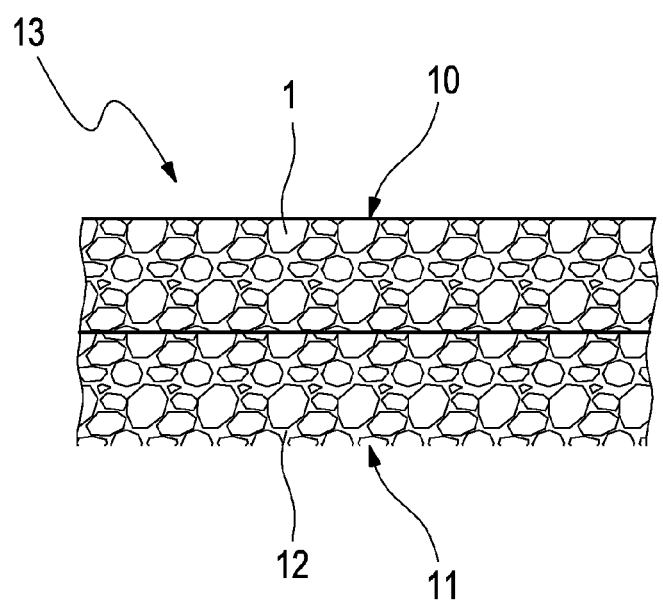
FIG. 4a is a sectional view showing one of different embodiments of an inside open porous and outside closed structure.
FIG. 4b is a sectional view showing another of different embodiments of an inside open porous and outside closed structure with different embodiments.
FIG. 4c is a sectional view showing another of different embodiments of an inside open porous and outside closed structure with different embodiments.
Figure 4:
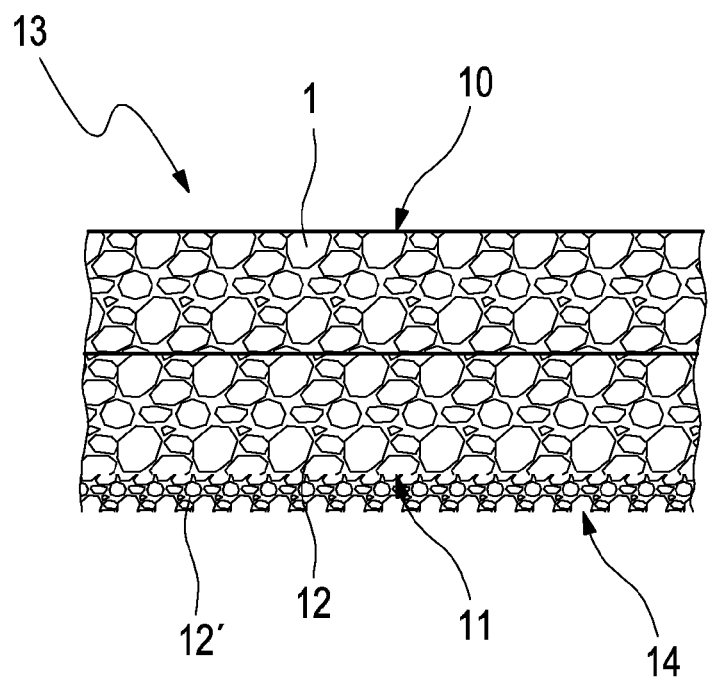
Figure 4:
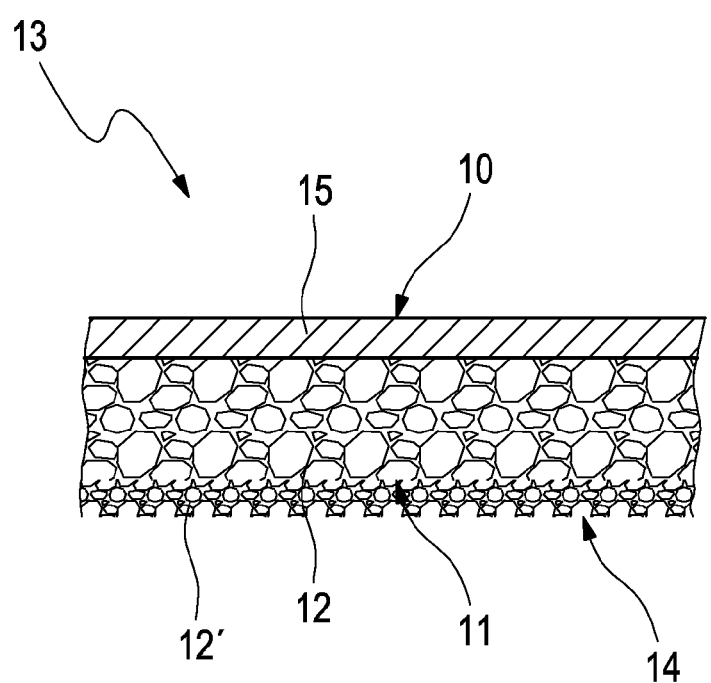

FIG. 4a shows a two-layered foam structure 13 which on the outside comprises an outer layer 10 of a closed porous foam 1 and inside an inner layer 11 of an open porous foam 12. Through such a material pairing improved acoustics of an exhaust system can be achieved by means of sound-absorbing through the open porous foam 12 arranged on the inside. The closed-pore outer layer 10 ensures the required gas-tightness and fulfils a support function for the open-pore inner layer 11.

The inside is exposed to the exhaust gas flow. In order to reduce the friction or the flow resistance on the open-pore inside it can be practical according to FIGS. 4b and 4c to provide a three-layered foam structure 13. With the version of FIG. 4b the outer layer 10 is again produced from a closed-pore foam 1 and the inner layer 11 produced from an open-pore foam 12 is provided with a further layer 14 on its inside, which in the following is designated lining layer 14. The lining layer 14 is likewise produced from an open-pore foam 12', which however has a smaller pore size than the open-pore foam 12 of the inner layer 11. The lining layer 14 thus has a reduced flow resistance and is permeable to airborne sound, to the dampening of which the inner layer 11 located behind is designed with respect to the pore size of its foam 12.

With the version of FIG. 4c the outer layer 10 is formed through a solid, that is non-foamed pipe 15. The inner layer 11 consists of the open-pore foam 12 with larger pore size. The lining layer 14 consists of the open-pore foam 12' with a smaller pore size. With same support function as the closed-pore foam 1 the pipe 15 has a clearly reduced wall thickness, as a result of which the wall forms through the foam structure 13 has a reduced wall thickness with same load-bearing capacity. It is clear that the layered foam structure 13 can also comprise more than three layers.

While specific embodiments of the invention have been shown and described in detail to illustrate the application of the principles of the invention, it will be understood that the invention may be embodied otherwise without departing from such principles.

What is claimed is:

1. An internal combustion engine exhaust system component comprising a self-supporting exhaust system component jacket comprising:

an outer layer comprised of a closed-pore foam or of a non-porous tube, the outer layer forming an exhaust system component jacket outer surface;

an inner layer inside of the outer layer and adjoining the outer layer, the inner layer comprising porous cellularly constructed open pore foam, wherein the foam of the inner layer is of a self-supporting design; and a lining layer inside of the inner layer and adjoining the inner layer, the lining layer comprising an open-pore foam wherein the open-pore foam of the lining layer has a smaller pore size than the open-pore foam of the inner layer, the lining layer forming an exhaust system component jacket inner surface.

2. The component according to claim 1, wherein at least the inner layer of foam is baked onto at least one of the outer layer and the liner layer, respectively.

3. The component according to claim 1, wherein at least one of the inner layer and the lining layer, respectively, is integrally formed with or from the foam of the inner layer.

4. The component according to claim 1, wherein the foam of at least one of the outer layer, the inner layer and the lining layer consists essentially of at least one of a metal and a mineral material.

5. The component according to claim 1, wherein the jacket further comprises at least one connecting element which is designed integrally with the jacket.

6. An internal combustion engine exhaust system comprising:
   an exhaust gas pipe; and
   an exhaust component connected to the exhaust gas pipe, the exhaust component comprising a self-supporting exhaust system component jacket comprising a porous cellularly constructed foam, wherein the foam has self-supporting properties and the exhaust system component jacket comprises:
   an outer layer comprising a closed-pore foam or of a non-porous tube, the outer layer forming an exhaust system component jacket outer surface;
   an inner layer inside of the outer layer and adjoining the outer layer, the inner layer comprising porous cellularly constructed open pore foam; and
   a lining layer inside of the inner layer and adjoining the inner layer, the lining layer comprising an open-pore foam wherein the open-pore foam of the lining layer has a smaller pore size than the open-pore foam of the inner layer, the lining layer forming an exhaust system component jacket inner surface.

7. The exhaust system according to claim 6, wherein:
   the foam is baked onto at least one of the outer layer and the linear layer, respectively; and
   at least one of the linear layer and the outer layer, respectively, is integrally formed with or from the foam.

8. The exhaust system according to claim 7, wherein the foam comprises at least one of metal and a mineral material.

9. The exhaust system according to claim 6, wherein the material of the jacket in at least two regions has at least one of a different density and a different material and a different wall thickness as compared to a remainder of the multi-layered foam structure.

10. A method for producing a component of an internal combustion engine exhaust system, the method comprising the steps of:
   providing a raw foam compound;
   admixing a foaming agent in different concentrations to the raw foam compound in at least two jacket regions; and
   baking of the raw foam compound with two jacket regions so that a component jacket has, in at least the two jacket regions, following the baking, at least one of a different density and a different material thickness to form a self-supporting jacket comprising:
   an outer layer comprising a closed-pore foam or of a non-porous tube, the outer layer forming an exhaust system component jacket outer surface;
   an inner layer inside of the outer layer and adjoining the outer layer, the inner layer comprising a porous cellularly constructed open pore foam; and
   a lining layer inside of the inner layer and adjoining the inner layer, the lining layer comprising an open-pore foam wherein the open-pore foam of the lining layer has a smaller pore size than the open-pore foam of the inner layer, the lining layer forming an exhaust system component jacket inner surface.

11. The component according to claim 4, wherein the outer layer, the foam of the inner layer and the foam of the lining layer comprise at least one of an aluminum alloy and a stainless steel alloy.

12. The component according to claim 11, wherein the jacket inner surface is an inner hot exhaust gas passage surface in contact with an exhaust stream and the inner hot exhaust gas passage surface defines an inner hot exhaust gas passage.

13. The component according to claim 1, wherein the outer layer comprises a stainless steel alloy foam, the lining layer comprises an aluminum alloy foam or a stainless steel alloy foam and the inner layer comprises an aluminum alloy foam.

14. The component according to claim 1, wherein the jacket inner surface is an inner hot exhaust gas passage surface in contact with an exhaust stream and the inner hot exhaust gas passage surface defines an inner hot exhaust gas passage.

15. The component according to claim 14, wherein the outer layer comprises a stainless steel alloy foam, the lining layer comprises an aluminum alloy foam or a stainless steel alloy foam and the inner layer comprises an aluminum alloy foam.

16. The exhaust system according to claim 8, wherein the outer layer, the foam of the inner layer and the foam of the lining layer comprise at least one of an aluminum alloy a stainless steel alloy.

17. The exhaust system according to claim 8, wherein the jacket inner surface is an inner hot exhaust gas passage surface in contact with an exhaust stream and the inner hot exhaust gas passage surface defines an inner hot exhaust gas passage.

18. The exhaust system according to claim 17, wherein the outer layer comprises a stainless steel alloy foam, the lining layer comprises an aluminum alloy foam or a stainless steel alloy and the inner layer comprises an aluminum alloy foam.

19. The method according to claim 10, wherein the jacket inner surface is an inner hot exhaust gas passage surface in contact with an exhaust stream and the inner hot exhaust gas passage surface defines an inner hot exhaust gas passage.

20. The method according to claim 19, wherein the outer layer comprises a stainless steel alloy foam, the lining layer comprises an aluminum alloy foam or a stainless steel alloy foam and the inner layer comprises an aluminum alloy foam.

* * * * *